3,418,324
HETEROCYCLIC SECONDARY AMINES
Leonard M. Rice, Minneapolis, Minn., and Charles H. Grogan, Falls Church, Va., assignors to Geschickter Fund for Medical Research, Inc., Washington, D.C., a corporation of the District of Columbia
No Drawing. Continuation-in-part of application Ser. No. 95,042, Mar. 13, 1961. This application May 25, 1964, Ser. No. 370,099
The portion of the term of the patent subsequent to Sept. 22, 1981, has been disclaimed
1 Claim. (Cl. 260—293)

The present invention relates to new heterocyclic secondary amines and methods for their preparation. More specifically, this invention relates to azaspiranes and methods for their preparation.

This application is a continuation-in-part application of copending application Ser. No. 95,042, filed Mar. 13, 1961, now abandoned.

The novel azaspiranes of the instant invention are valuable synthetic intermediates particularly valuable in the preparation of products having medicinal properties, such as those described in applicants' copending applications Ser. Nos. 43,747, now Patent No. 3,150,143, and 43,719, now Patent No. 3,106,552 (both filed on July 19, 1960), and 89,939, now Patent No. 3,256,276 (filed on Feb. 17, 1961), now U.S. Patents 3,150,143, 3,106,552 and 3,256,276, respectively, since they undergo typical reactions of secondary amines. For example, they may be alkylated, they will react in the Mannich reaction and may be converted into a variety of N-substituted azaspirane derivatives by replacement of the secondary amine hydrogen (i.e., alkenyl, alkyl, aryl, carboxyalkyl, cyanoalkyl and other functional groups suitable for further transformation on the reactive side chain thus introduced) or through reaction with expoxides.

A primary object of the present invention is to provide novel, valuable secondary amines combined as part of an azaspirane structure.

Another and equally important object is to provide methods of synthesizing these azaspiranes.

These and further objects of the present invention will become apparent from the following description and illustrative examples.

The novel secondary amines of the present invention have the following general formula:

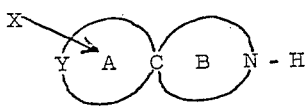

wherein A is a mono or bicyclic ring of at least 5 atoms; C is a spiro carbon atom connecting rings A and B; B is a five or six membered saturated heterocyclic ring, one atom of which is nitrogen, said nitrogen atom being at least one carbon atom removed from the spiro carbon atom connecting rings A and B when Y is carbon; X is a substitutent on ring A selected from the group consisting of hydrogen, alkyl, alkenyl, cycloalkyl, aryl (such as phenyl) or alkoxy, a plurality of any of these, or any combination of these; and Y is an atom selected from the group consisting of carbon, sulfur and oxygen. While there is no particular limit on the number of atoms in ring A, a ring of 5 to 15 atoms is preferred.

The novel azaspiranes of the present invention may be obtained by the following methods:

(1) Reaction of ammonia with a cyclic-gem-carboxyacetic or cyclic-gem-diacetic acid anhydride, followed by ring closure of the resultant amic acid to the desired imide by heating for a sufficient time at a temperature between about 140–240° C., and reduction of said imide by suitable means to the desired azaspirane.

(2) Reaction of acyclic-gem-carboxy-acetic or cyclic-gem-diacetic acid anhydride with benzylamine and heating to a temperature of about 240° C. to cyclize the amic acid initially obtained to the corresponding N-benzyl imide and reducing the carbonyl groups of said imide and then catalytically removing the benzyl group from the N-benzyl spiro amine.

(3) Treatment of the desired cyclic-gem-hydroxymethyl-hydroxyethyl or cyclic-gem-bis-hydroxyethyl glycol with ammonia (preferably in a suitable solvent, such as dioxane) in the presence of a suitable catalyst, such as copper chromite, in a bomb tube under high pressure (about 2000–6000 p.s.i.) and at a temperature between 150 and 300° C. (preferably between 200 and 300° C.) for a suitable time, 1 to 6 hours. Under these conditions of high temperature and ammonia pressure, elminiation of water occurs with ring closure by the ammonia. The desired pressure conditions may be readily obtained by using liquid ammonia.

The following examples will illustrate the operative procedures that yield the compounds of the present invention. These examples are intended to be illustrative only and by no means restrictive of all of the compounds that can be prepared according to the processes disclosed by the present invention.

Example I.—3-azaspiro[5.5]undecane (A) N - benzyl - 3 - azaspiro[5.5]undecane - 2,4 - dione.—Reaction of 18.2 gm. (0.1 M) of the anhydride of cyclohexane-1,1-diacetic acid with 11 gm. of benzylamine and cyclization for 1 hour at 240° C. yielded the N-benzyl imide (B.P. 150–155° C./0.075 mm.; 96% yield). It solidified and melted at 58–62° C. It may be purified by recrystallization from methanol-water or acetone-water and melts at 62–3° C. It is not necessary to further purify the imide for the next step.

(B) N-benzyl-3-azaspiro[5.5]undecane.—32 gm. of the imide prepared as in paragraph A, when reduced with lithium aluminum hydride in anhydrous ether, yield N-benzyl-3-azaspiro[5.5]undecane (26 gm.; 90% yield, with a boiling point of 100–106° C./0.05 mm.). Treatment of this base in ether with gaseous hydrogen chloride yielded the corresponding hydrochloride having a M.P. of 262–263° C.

(C) 3-azaspiro[5.5]undecane.—25 gm. of the base prepared as described in paragraph B were dissolved in 150 ml. of methanol and to this were added 3 ml. of concentrated hydrochloric acid and 3 gm. of 10% palladium catalyst on charcoal. The mixture was placed in a hydrogenation flask and shaken overnight at 60° C. starting with an initial pressure of 50–75 p.s.i. The material absorbed the theoretical amount of hydrogen for cleavage of the benzyl group. The reaction mixture was filtered of catalyst, dried over sodium sulfate and concentrated to a small volume, whereupon much crystalline material separated. Ethyl acetate or ethyl ether was added until no more cloudiness resulted and the mixture cooled and filtered to yield 17.5 gm. of 3-azaspiro[5.5]undecane hydrochloride (M.P. 236–238° C.). On recrystallization from methanol-ether, methanol-ethyl acetate or acetone, the salt melted at 239–240° C. Infrared spectral analysis confirmed the absence of carbonyl groups and a mixed melting point with the original imide resulted in a depression to 200° C. or less.

The free amine, 3-azaspiro[5.5]undecane, can be readily obtained by solution of the hydrochloride in water and addition of solid caustic. The amine is extracted into ether, dried over sodium sulfate, the ether stripped and the amine distilled (B.P. 109–112° C./20 mm.). The picrate of this amine was prepared and melted at 194–195° C.

Example II.—3-azaspiro[5.5]undecane 10 gm. of cyclohexane-1,1-diethanol (obtained from reduction of the diethyl ester of cyclohexane-1,1-diacetic acid) was dissolved in 30 ml. of dioxane, 5 gm. of liquid ammonia and 3 gm. of copper chromite catalyst added, and the mixture placed in a steel hydrogenation bomb. The bomb was heated at 250° C. for 2 hours, cooled and opened. After filtration and allowing excess ammonia to evaporate, the dioxane was removed at the aspirator and the resultant mixture acidified with concentrated hydrochloric acid. The remaining acidified mother liquor was evaporated to dryness under reduced pressure, redissolved in absolute methanol and ether or ethyl acetate added to precipitate the amine hydrochloride. The amine hydrochloride melted at 239–240° C. after recrystallization and was identical with that obtained in Example I.

Example III.—3-azaspiro[5.5]undecane

Reaction of 18.2 gm. (0.1 M) of the anhydride of cyclohexane-1, 1-diacetic acid with excess saturated aqueous ammonia, boiling off the water and heating at 160–180° C. for 2 hours yielded the corresponding imide (M.P. 166–168° C.). Recrystallization from acetone-water gave a product having a M.P. of 168–169° C. Reduction of 15 gm. of this imide in anhydrous ether solution with lithium aluminum hydride yielded the corresponding 3-azaspiro[5.5]undecane (B.P. 100–102° C./12 mm.). It was converted into the hydrochloride by treating a solution of the base in anhydrous ether with gaseous hydrogen chloride. The hydrochloride obtained was identical with those obtained in Examples I and II. Mixed melting points of the amine hydrochlorides or picrates obtained in Examples I–III showed them to be identical as no depression occurred.

Examples IV.—2-azaspiro[4.4]nonane (A) 2-azaspiro[4,4]nonane - 1,3 - dione.—Reaction of 16.4 grams of the anhydride of cyclopentane-1-carboxy-1-acetic acid with an excess of saturated aqueous ammonia solution, boiling off the water and cyclization at 180° C. gave a quantitative yield of the title imide which, on recrystallization from acetone-water, melted at 120–122° C.

(B) 2-azaspiro[4.4]nonane.—Reduction of the imide obtained in A with lithium aluminum hydride in anhydrous ether yielded the title base (H.P. 70° C./14 mm.; 80% yield). The imide is only slightly soluble in ether. The reduction was carried out on a finely divided slurry of the imide in ether.

The picrate of this amine, prepared as a characterizing derivative, melted at 61.5–162° C.

From the above it may be seen that the formation of the novel, synthetically useful secondary amines of the present invention can be accomplished in several alternative ways. The reaction of the anhydrides of other cyclic-gem-carboxy-acetic or cyclic-gem-diacetic acids with ammonia and reduction of the imide thus obtained or the formation of the benzyl imide and catalytically reducing and debenzylating this imide can be extended to cover other similar anhydrides, such as:

cyclohexane-1-carboxy-1-acetic;
3-methylcyclohexane-1-carboxy-1-acetic;
3-methylcyclohexane-1,1-diacetic;
3-allyl-cyclohexane-1-carboxy-1-acetic;
4-methylcyclohexane-1-carboxy-1-acetic;
4-methylcyclohexane-1,1-diacetic;
4-methoxycyclohexane-1-carboxy-1-acetic;
4-methoxycyclohexane-1,1-diacetic;
4-t-butylcyclohexane-1-carboxy-1-acetic;
4-t-butylcyclohexane-1,1-diacetic;
cycloheptane-1-carboxy-1-acetic;
cycloheptane-1,1-diacetic;
3-methylcyclopentane-1-carboxy-1-acetic;
cycloheptane-1-carboxy-1-acetic;
cycloheptane-1,1-diacetic;
cyclooctane-1-carboxy-1-acetic;
cyclooctane-1,1-diacetic;
trans-hexahydrohydrindene-2-carboxy-2-acetic;
trans-hexahydrohydrindene-2,2-diacetic;
trans-decalin-2,2-diacetic;
cyclopentadecane-1-carboxy-1-acetic;
3-octyl-4-oxacyclohexane-1-carboxy-1-acetic;
3-octyl-4-thiacyclohexane-1-carboxy-1-acetic;
3-dodecyl-4-oxacyclohexane-1-carboxy-1-acetic;
3-dodecyl-4-thiacyclohexane-1-carboxy-1-acetic;
3-(11-dodecenyl)-4-oxacyclohexane-1-carboxy-1-acetic;
3-(11-dodecenyl)-4-thiacyclohexane-1-carboxy-1-acetic;
3-(5-hexenyl)-4-oxacyclohexane-1-carboxy-1-acetic;
3-(5-hexenyl)-4-thiacyclohexane-1-carboxy-1-acetic;
3-(2-naphthyl)-4-oxacyclohexane-1-carboxy-1-acetic;
3-(2-naphthyl)-4-thiacyclohexane-1-carboxy-1-acetic;
3-(p-isopropylphenyl)-4-oxacyclohexane-1-carboxy-1-acetic;
3-(p-isopropylphenyl)-4-thiacyclohexane-1-carboxy-1-acetic;
3,5-diphenyl-4-oxacyclohexyl-1-carboxy-1-acetic;
3,5-diphenyl-4-oxacyclohexyl-1-carboxy-1-acetic;
3,5-dicyclohexyl-4-oxacyclohexane-1-carboxy-1-acetic;
3,5-dicyclohexyl-4-thiacyclohexane-1-carboxy-1-acetic;
3-methyl-5-cyclohexyl-4-oxacyclohexane-1-carboxy-1-acetic;
3-methyl-5-cyclohexyl-4-thiacyclohexane-1-carboxy-1-acetic;
3-phenyl-4-oxacyclohexane-1-carboxy-1-acetic;
3-phenyl-4-thiacyclohexane-1-carboxy-1- acetic;
3-methyl-5-phenyl-4-oxacyclohexane-1-carboxy-1-acetic;
3-methyl-5-phenyl-4-thiacyclohexane-1-carboxy-1-acetic;
3-(p-chlorophenyl)-4-oxacyclohexane-1-carboxy-1-acetic;
3-(p-chlorophenyl)-4-thiacyclohexane-1-carboxy-1-acetic;
4-cyclohexyl-cyclohexane-1-carboxy-1-acetic;
4-cyclohexyl-cyclohexane-1,1-diacetic;
4-phenylcyclohexane-1-carboxy-1-acetic;
3-thiacyclopentane-1-carboxy-1-acetic;
3-thiacyclopentane-1,1-diacetic;
4-thiacyclohexane-1-carboxy-1-acetic;
4-thiacyclohexane-1,1-diacetic;
4-oxacyclohexane-1-carboxy-1-acetic;
4-oxacyclohexane-1,1-diacetic;
3,5-dimethyl-4-oxacyclohexane-1-carboxy-1-acetic;
4-octylcyclohexane-1,1-diacetic;
4-dodecylcyclohexane-1,1-diacetic;
3-hendecylcyclohexane-1-carboxy-1-acetic;
3-butoxycyclohexane-1,1-diacetic;
4-hexoxycyclohexane-1,1-diacetic;
3-isoamoxycyclohexane-1-carboxy-1-acetic;
4-(11-dodecenyl)-cyclohexane-1-carboxy-1-acetic;
4-(5-hexenyl)-cyclohexane-1,1-diacetic;
4-cyclopentadecyl-cyclohexane-1,1-diacetic;
4-cyclododecyl-cyclohexane-1,1-diacetic;
4-(2-naphthyl)-cyclohexane-1-carboxy-1-acetic;
4-(p-isopropylphenyl)-cyclohexane-1,1-diacetic;
4-(p-chlorophenyl)-cyclohexane-1-carboxy-1-acetic;
4,4-diphenyl-cyclohexane-1,1-diacetic;
3,3-dicyclohexyl-cyclohexane-1-carboxy-1-acetic;
3-methyl-4-cyclohexyl-cyclohexane-1,1-diacetic;
3-methoxy-4-phenyl-cyclohexane-1,1-diacetic;
or 3,5-dimethyl-4-oxacyclohexane-1,1-diacetic anhydrides.

It is thus seen that the methods presented are of wide applicability and afford routes to large numbers of valuable synthetic intermediates.

In addition to substituting groups for the secondary amine hydrogen previously referred to, the azaspiranes herein disclosed can be utilized in a very wide variety of synthetic reactions to yield valuable medicinal products as well as products having utility for further synthetic transformations. To obtain the products of the type disclosed in copending application Ser. No. 43,719, for example, 10 gm. of 3-azaspiro[5.5]undecane was refluxed for 3 hours in acetone with 8 gm. of dimethylaminopropyl chloride. The mixture was cooled and 3 ml. of a saturated solution of hydrogen chloride in ethanol added. The solution was stripped to dryness, redissolved in a minimum of ethanol and absolute ether added. On refrigeration overnight, the dihydrochloride of 3-(3-dimethylaminopropyl)-3-azaspiro[5.5]undecane [Example 2(*b*) of copending application Ser. No. 43,719] was obtained (M.P. 305–306° C.). The dimethiodide of Example 2(*c*) of that application was prepared by dissolving 6 gm. of the above dihydrochloride in water and adding several pellets of solid caustic until highly alkaline, extracting with ether, washing the ether extracts with water, drying over sodium sulfate, diluting with an equal volume of isopropyl alcohol and refluxing with slightly more than 2 molar equivalents of methyl iodide. On cooling and addition of ether, the bis-quaternary salt crystallized and melted at 252–3° C.

In a similar manner, products of the type disclosed in copending applications Ser. Nos. 43,747 and 89,939 (the latter filed on Feb. 17, 1961) may be prepared.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

We claim:

1. A compound selected from the group consisting of compounds of the formula:

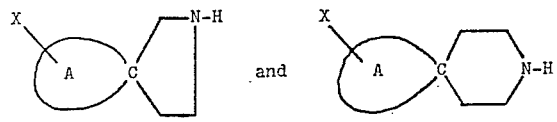

wherein ring A is selected from the group consisting of monocarbocyclic rings having 5 to 15 carbon atoms, hexahydrohydrindenyl and decahydronaphthyl; X is at least one substituent on ring A selected from the group consisting of alkyl of up to 12 carbon atoms, lower alkoxy, lower alkenyl, cycloalkyl of up to 6 carbon atoms, phenyl and naphthyl.

References Cited

UNITED STATES PATENTS

| | | | |
|---|---|---|---|
| 2,184,199 | 3/1957 | Grogan et al. | 260—326 |
| 3,025,300 | 3/1962 | Huebner | 260—326 |
| 3,257,398 | 6/1966 | Grogan et al. | 260—293 |
| 3,106,552 | 10/1963 | Grogan et al. | 260—247.2 |
| 3,150,143 | 9/1964 | Grogan et al. | 260—293 |

FOREIGN PATENTS 824,140  11/1959  Great Britain.

OTHER REFERENCES

Hermanek, Coll. of Czech. Chem. Comm., vol. 24, pp. 2748–2753, 1959.

Ring Index, p. 221, formula 1713 and 1714 2nd. ACS (1960).

Schreyer J. Am. Chem. Soc., vol. 74, p. 3194 (1952).

Theilheimer, Synthetic Methods of Organic Chem., vol. 15, p. 255, Reaction 330, Karger, N.Y. (1961).

Teilheimer, Synthetic Methods of Organic Chem., vol. 17, p. 172, Reaction 417, Karger, N.Y. (1963).

Ring Index, p. 171, formula 1312, 1313, and p. 179, formula 1381 2nd. ed. ACS (1960).

Cope et al., J. Am. Chem. Soc., vol. 78, pp. 5916–5920 (1956).

JOHN D. RANDOLPH, *Primary Examiner.*

E. D. LEWIS, *Assistant Examiner.*

U.S. Cl. X.R.

260—294.7, 313.1, 326, 293.4, 326.5

PO-1050
(5/69)

UNITED STATES PATENT OFFICE
CERTIFICATE OF CORRECTION

Patent No. 3,418,324      Dated December 24, 1968

Inventor(s) Leonard M. Rice and Charles H. Grogan

It is certified that error appears in the above-identified patent and that said Letters Patent are hereby corrected as shown below:

Column 1, line 27, omit "now U.S. Patents 3,150,143, 3,106,552 and 3,256,-";
          line 28, omit "276, respectively,".
Column 3, line 37, change "4,4" to --4.4--;
          line 46, change "cycloheptane" to --cyclopentane--;
          line 47, change "cycloheptane" to --cyclopentane--.
Column 4, line 18, change "p-" to --$\underline{p}$- --;
          line 20, change "p-" to --$\underline{p}$- --;
          line 38, change "p-" to --$\underline{p}$- --;
          line 40, change "p-" to --$\underline{p}$- --;
          line 62, change "p-" to --$\underline{p}$- --;
          line 63, change "p-" to --$\underline{p}$- --.

SIGNED AND
SEALED

SEP 2 - 1969

(SEAL)
Attest:

Edward M. Fletcher, Jr.

Attesting Officer

WILLIAM E. SCHUYLER, JR
Commissioner of Patents